United States Patent [19]

Otsuki

[11] Patent Number: 4,881,608
[45] Date of Patent: Nov. 21, 1989

[54] COORDINATES INPUT SYSTEM TO DATA TRANSMITTER

[75] Inventor: Shinnichirou Otsuki, Yokohama, Japan

[73] Assignee: Canon Kabushiki Kaisha, Tokyo, Japan

[21] Appl. No.: 328,707

[22] Filed: Mar. 27, 1989

Related U.S. Application Data

[63] Continuation of Ser. No. 127,774, Dec. 1, 1987, abandoned.

[30] Foreign Application Priority Data

Dec. 16, 1986 [JP] Japan .................................. 61-297773
Dec. 16, 1986 [JP] Japan .................................. 61-297774

[51] Int. Cl.$^4$ ............................................ G08C 21/00
[52] U.S. Cl. ...................................................... 178/18
[58] Field of Search .............................. 178/18, 19, 20

[56] References Cited

U.S. PATENT DOCUMENTS 4,653,086 3/1987 Laube ..................................... 178/19

Primary Examiner—Stafford D. Schreyer
Attorney, Agent, or Firm—Fitzpatrick, Cella, Harper & Scinto

[57] ABSTRACT

There is a coordinates input system which is connected to a data transmitter such as a facsimile and inputs various kinds of data. This input system comprises a coordinates input unit to detect coordinates values input onto a plate; a print sheet set on the plate and on which instruction items to the data transmitter are written; an instructing unit to instruct in correspondence to the display item on the print sheet corresponding to the coordinates values; a control unit to output the instruction, corresponding to the instructed item, to the data transmitter; and a synthesizer to receive graphic data from the coordinates input unit and synthesize with information of an original to be transmitted the data transmitter. With this system, a destination address or the name of transmission side or the like can be input and synthesized as coordinates data by an operating unit. Various kinds of instructions can be output to the data transmitter.

12 Claims, 9 Drawing Sheets

COORDINATES INPUT SYSTEM TO DATA TRANSMITTER

This application is a continuation of application Ser. No. 127,774 filed Dec. 1, 1987 now abandoned.

BACKGROUND OF THE INVENTION

1. Field of the Invention

The present invention relates to a coordinates input system which is connected to a data transmitter such as a facsimile apparatus or the like and inputs various kinds of data.

2. Related Background Art

Hitherto, when data of an original is transmitted by a data transmitter such as a facsimile apparatus or the like, there are cases where the operator wants to add an address, message, or the like to the original. However, there is a problem that the original becomes dirty from the writing an address, message, or the like on the original itself, so that this document cannot itself be used as an original which is transmitted to another address. In addition, in a case where various kinds of control instruction are given in the data transmitter such as a facsimile apparatus or the like, it is also necessary to input instructions by an operation panel of the facsimile apparatus every time, and the operation is consequently very annoying.

SUMMARY OF THE INVENTION

The present invention is made in consideration of the foregoing conventional apparatus and it is an object of the invention to provide a coordinates input system in which data such as, for example, an address of the destination (reception side), a name of the transmission side, or the like which must conventionally be written onto the original itself can be input and synthesized as coordinates data from an operating unit and at the same time, each control instruction command can be output to a data transmitter such as a facsimile apparatus or the like.

DETAILED DESCRIPTION OF THE PREFERRED EMBODIMENTS

The preferred embodiments of the present invention will be described in detail hereinbelow with reference to the drawings. An explanation will be made with respect to the case where a facsimile apparatus is used as a data transmitter.

(a) First embodiment [Description of a coordinates input system (FIG. 1)]

Figure 1:
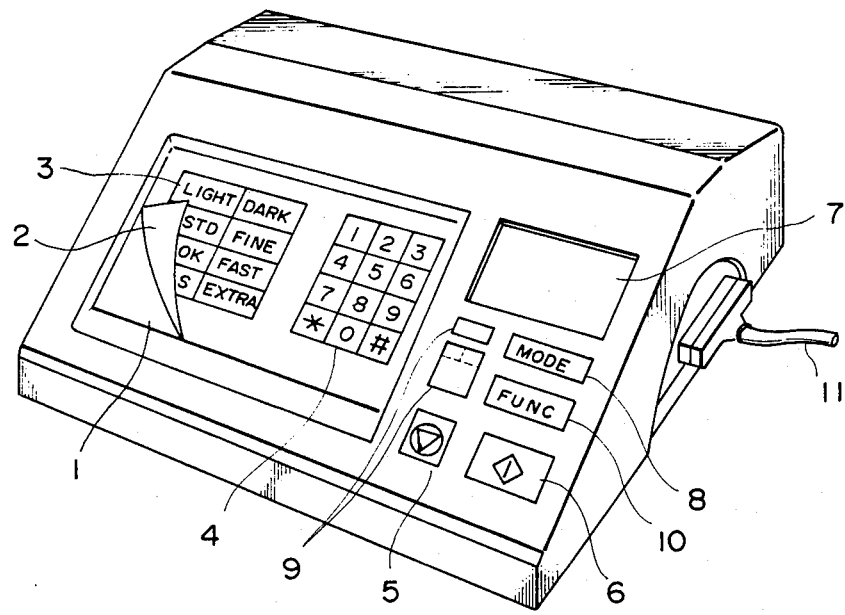
FIG. 1 is an external view of a coordinates input system of an embodiment of the present invention.

FIG. 1 is an external view of a coordinates input system of the first embodiment.

In the diagram, reference numeral 1 denotes a coordinates input unit for inputting various kinds of functions based on a printed sheet 2 and for inputting hand-written characters of an address or the like, or graphics or the like irrespective of the sheet 2. Numeral 3 denotes a facsimile transmitting function instructing unit printed on the sheet 2; 4 is a printed dial input unit to input a telephone number; 5 a stop key to stop facsimile communication; and 6 to a start key to instruct the start of facsimile communication.

Numeral 7 denotes a display unit to perfrom the display and the like of characters or graphics which have been input to the coordinates input unit 1; 8 is a mode key to switch the display of a display 9 every time the mode key 8 is depressed as will be explained hereinbelow, thereby indicating the relation between the data input from the coordinates input unit 1 and the document used as the transmitting original of the facsimile apparatus; 10 is a function key to indicate the kind of sheet 2 of the coordinates input unit 1 and to input and instruct various kinds of instructions to the facsimile apparatus; and 11 is a cable to perform the data transmission and reception with the facsimile apparatus connected. The kind, or the presence or absence, of the sheet 2 set on the coordinates input unit 1 can be also detected by providing a sheet detecting sensor for the coordinates input unit 1 in place of the function key 10.

[Description of the coordinates input unit (FIGS. 2 to 5)]

Figure 3:
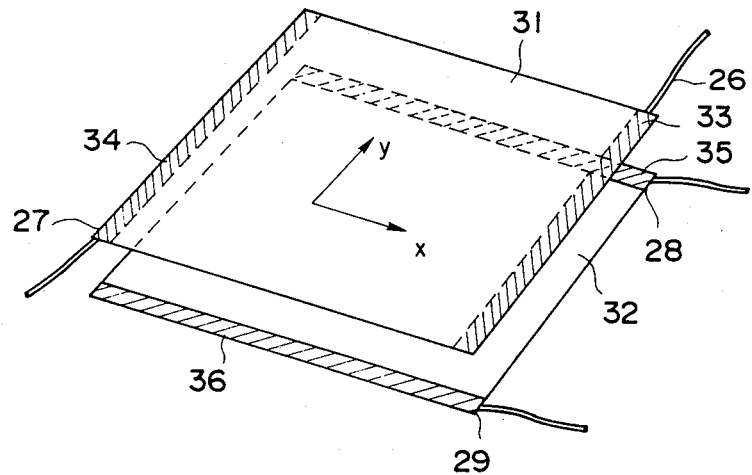
FIG. 3 is a diagram showing the positional relation of a resistance sheet.

FIG. 3 is a diagram showing a construction of the coordinates input unit 1.

Numerals 31 and 32 denote resistance sheets each of which is formed as carbon or the like onto the surface material such as carbon or the like onto the surface of an insulative sheet so that the resistance values of the surface are uniform. Electrodes 33 and 34 made of metal members are attached to two opposite sides of the resistance sheet 31. Likewise, electrodes 35 and 36 made of metal members are also attached to two opposite sides of the resistance sheet 32.

Figure 4:
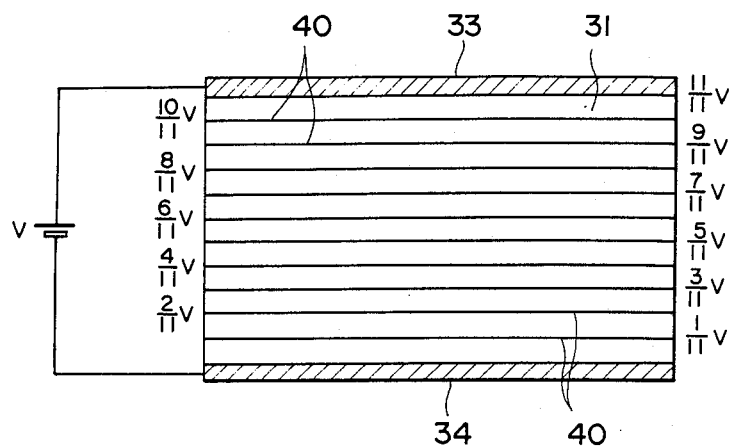
FIG. 4 is a diagram showing a potential distribution between the resistance sheets.

The potential distribution of the sheet 31 in shown in FIG. 4.

When a voltage V is applied to the electrodes 33 and 34 of the sheet 31, contour lines 40 of potentials which are parallel with the electrodes 33 and 34 are caused on the sheet 31. In FIG. 4, the electrode 33 is set to the positive (+) side. Numerals shown on the right and left sides of the sheet 31 indicate the potentials of the contour lines 40 to the electrode 34. It is assumed that the resistance sheet 32 also has a similar characteristic.

As shown in FIG. 3, two resistance sheets 31 and 32 as explained above are arranged so that the surfaces coated with the resistive materials inwardly face each other. Microribs having heights of about 0.05 to 0.3 mm are formed at proper positions on the sheets 31 and 32 so as not to ordinarily come into contact with each other.

The two sheets 31 and 32 are arranged so as to face each other in a manner such that the electrodes 33 and 34 and the electrodes 35 and 36 cross perpendicularly each other. Coordinates systems x and y of the coordinates input unit 1 are specified as shown in FIG. 3 in this manner.

Figure 2:
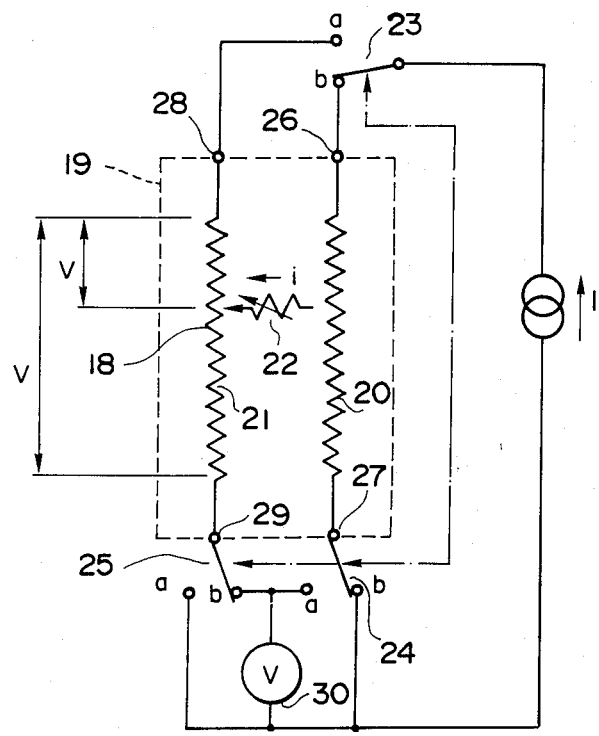
FIG. 2 is an equivalent circuit diagram showing a constitution of a coordinates input unit.

FIG. 2 is an equivalent circuit diagram of the coordinates input unit 1 with such a constitution as FIG. 3. In the diagram, a broken line section 19 corresponds to the coordinates detecting section shown in FIG. 3.

A resistance component 20 of the sheet 31 is used to detect the position in the X direction. Numeral 26 denotes a connecting portion of the positive (+) side and 27 indicates a connecting portion on the negative (−) side. A resistance component 21 of the resistance sheet 32 is similarly used to detect the coordinates in the y direction. Numeral 28 denotes a connecting portion on the (+) side and 29 represents a connecting portion on the (−) side. Switches 23 to 25 are simultaneously interlockingly switched. FIG. 2 shows a state in which the x coordinate is detected. When the y coordinate is detected, the switches 23 to 25 are all switched to the a side.

When an arbitary portion of either the sheet 31 or the sheet 32 is depressed and the sheet is deformed and a part of the sheet comes into contact with the other sheet, the sheets 31 aqnd 32 are connected through a contact resistance illustrated as a variable resistor 22. A voltmeter 30 detects the potential of a contact portion 18. When a resistance value which is sufficiently larger than the values of the resistors 20, 21, and 22 is selected as an internal resistance value of the voltmeter 30, a current flowing through the resistor 21 from the contact portion 18 is so small that the voltage drop across the contact resistor 22 and resistor 21 can be ignored. Due to this, a voltage drop v across the contact portion 18 can be obtained with high accuracy.

Figure 5:
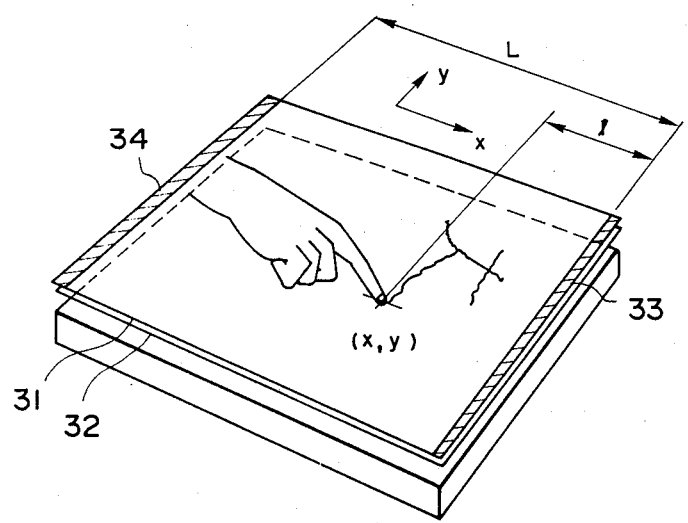
FIG. 5 is a diagram showing an example of a coordinates input format.

FIG. 5 is a diagram showing the case of inputting characters by depression using a finger. Assuming that the voltage between the electrodes is set to V, the distance between the electrodes 33 and 34 is set to L, the voltage drop across the contact point is set to v, and the distance between the contact point and the electrode 33 is set to l, l is expressed by $$l = v/V \times L$$

Thus, the x coordinate of the contact point is given by x=L−l or l. Next, the switches 23 to 25 are switched to the a side. Similarly, the coordinate in the y direction is obtained. Thus, the coordinates (x, y) of the contact point can be detected. [Overall construction of the coordinates input system (FIG. 6)]

Figure 6:
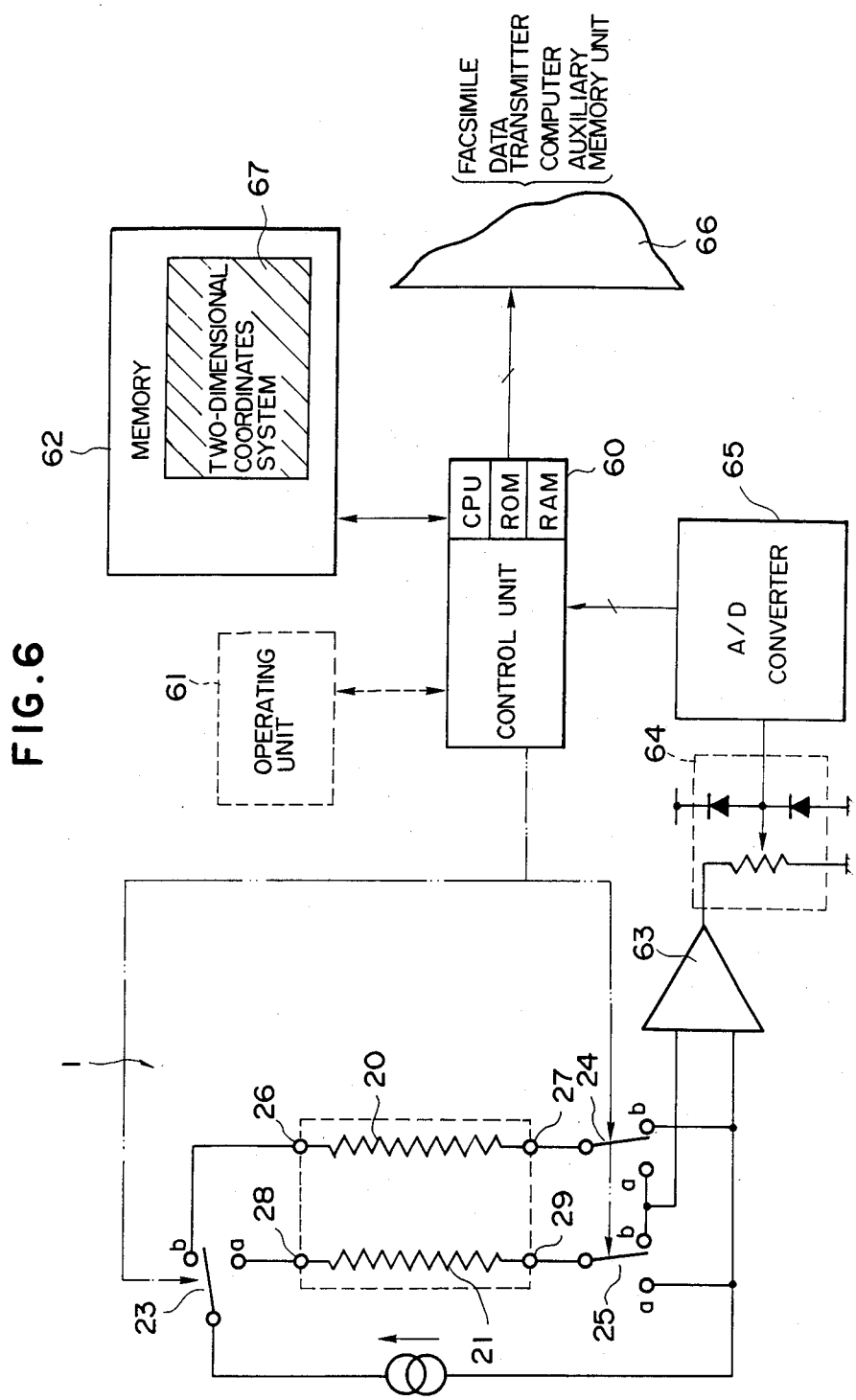
FIG. 6 is a block diagram showing a constitution of the coordinates input system of the embodiment.

FIG. 6 is a block diagram showing the overall construction of the coordinates input system in this embodiment. In the diagram, the same parts and components as those shown in FIG. 2 are designated by the same reference numerals and their descriptions are omitted.

In FIG. 6, reference numeral 60 denotes a control unit to control the whole system and to perform the detection of the coordinates values from the coordinates input unit 1, the input of hand-written characters, or the like, etc. For example, the control unit 60 comprises: a CPU such as, e.g., a microprocessor or the like; a ROM in which the control program, data, etc., of the CPU are stored; an RAM serving as a work area; and the like. Numeral 61 denotes an operating unit having the display unit 7, various kinds of switches, and the like. Numeral 62 indicates a memory to detect the coordinates values from the coordinates input unit 1. The memory 62 has a memory 67 of the two dimensional coordinates system.

Numeral 63 denotes a differential amplifier to detect the potential of the contact point; 64 is a level converting unit to convert the level of the output value of the differential amplifier 63; and 65 and A/D converter to A/D convert the level converted output value of the amplifier 63. The CPU of the control unit 60 can input the potential of the contact point as the digital value through the A/D converter 65. Numeral 66 represents a data transmitter such as, e.g., a facsimile apparatus or the like. The data transmitter 66 transmits data of a facsimile original, including hand-written characters or graphic data, from the coordinates input system in accordance with an instruction of the coordinates input system in this embodiment.

The control unit 60 sets the memory 67 of the two-dimensional coordinates system according to the resolution of the detecting unit into the memory 62 and calculates the coordinates in the memory 67 in correspondence to the coordinates data of x and y which were obtained from the coordinates input unit 1, thereby setting a flag indicative of the presence of the input into the memory address.

For example, assuming that the hand-writing speed of the operator is set to 55 mm/sec as the maximum speed and the resolution of the coordinates input unit 1 is set to 0.25 mm/dot, the dot processing speed of the control unit 60 becomes Therefore, if the coordinates of the contact point are detected by the control unit 60 at a speed of 2000 times or more per second, hand-written characters can be smoothly input. Since the coordinates input unit 1 detects position by depression, the kind of writing tool is not limited. In the case of roughly inputting coordinates, the position may for example be designated by an object as broad as a finger tip as shown in FIG. 5. [Explanation of an example of a sheet (FIG. 7)]

Figure 7:
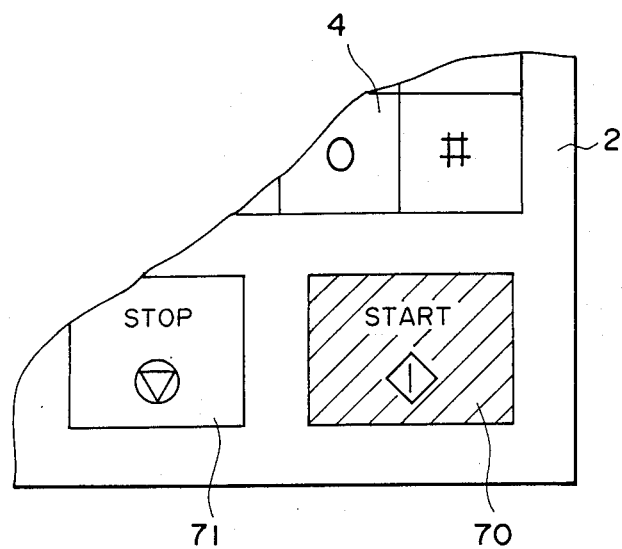
FIG. 7 is a diagram showing an example of a sheet of the coordinates input unit.

FIG. 7 is a diagram showing another embodiment of the print sheet 2 of the coordinates input unit 1.

A switch input unit of a start key 70 and a stop key 71 is provided below the dial input unit 4 on the sheet 2. It is possible to instruct in a manner similar to the stop key 5 or start key 6 of the main unit. In the case of using the coordinates input system in this manner, the detection accuracy of the coordinates may be set to a slightly rough accuracy.

[Relation with an original (FIG. 8)]

The synthesizing position, magnitude, or the like of information from the original having graphic data such as hand-written characters or the like which were input from the coordinates input unit can be freely changed by a data processing operation on information in the memory 62. Therefore, the relation between the data such as characters, graphics, or the like which were input from the coordinates input unit 1 by the mode switch 8 and the transmitting original in a facsimile apparatus or the like 66 can be specified as shown in FIG. 8 by use of the display 9.

Figures 8A, 8B, 8C, 8D, 8E, 8F:
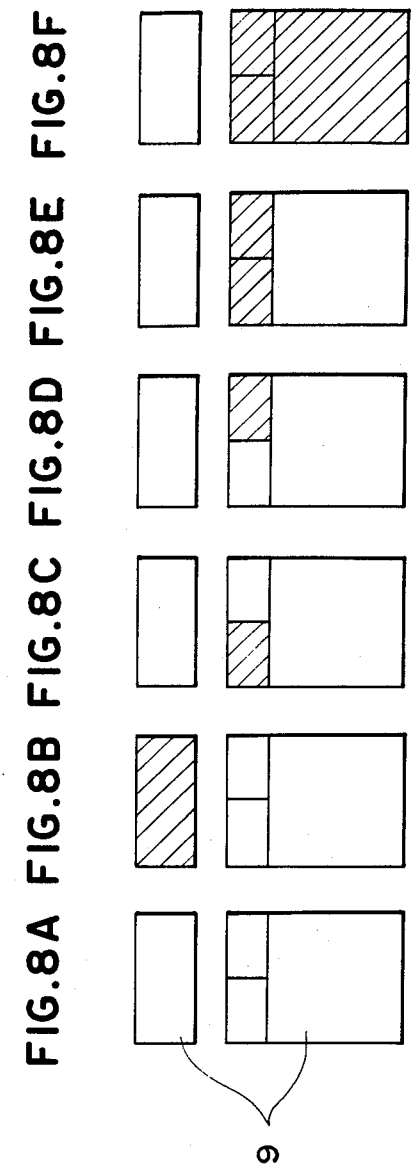
FIGS. 8A to 8F are diagrams showing display examples of the synthesizing function by a display.

FIGS. 8A to 8F illustrate examples of the display contents shown by the display 9 corresponding to the depression of the mode switch 8. FIG. 8A shows the mode in which the graphic data input from the coordinates input unit 1 is not transmitted as an original. FIG. 8B shows the mode in which the transmitting original is input to another page. FIG. 8C shows the mode to synthesize at the left upper position of the original. FIG. 8D shows the mode to synthesize at the right upper position of the original. FIG. 8E shows the mode to extend the graphic data from the coordinates input unit 1 in the lateral direction and synthesize at the upper position of the original. FIG. 8F shows the mode to transmit only the graphic data from the coordinates input unit 1 without transmitting the original of the facsimile apparatus.

Further, for example, when the facsimile original and the graphic data such as hand-written characters or the like from the coordinates input unit 1 are synthesized, it is also possible to synthesize with only a predetermined portion in the memory 62 as instructed by a flag or the like, or to synthesize by performing an arithmetic operation with the orignal data, e.g., by calculating an exclusive OR or the like.

As a method of synthesizing the facsimile original with the graphic data from the coordinates input unit, for example, the graphic data is transmitted as raster data to the facsimile apparatus and stored in a memory for transmission in the facsimile apparatus. Thereafter, when the original is transmitted, the facsimile apparatus can also synthesize the graphic data in the memory with the image data of an original and then transmit. On the other hand, it is also possible that the coordinates input system transmits and receives a timing signal to and from the facsimile apparatus and transmits the graphic data in the memory 67 to the facsimile apparatus synchronously with the transmission of the original by the facsimile apparatus, thereby synthesizing it with the original.

In all of these cases, it is assumed that the graphic data in the memory 62 is converted so as to obtain the correlation with the original in correspondence to the display content of the display 9 by the mode key 8.

(b) Second embodiment

Figure 9:
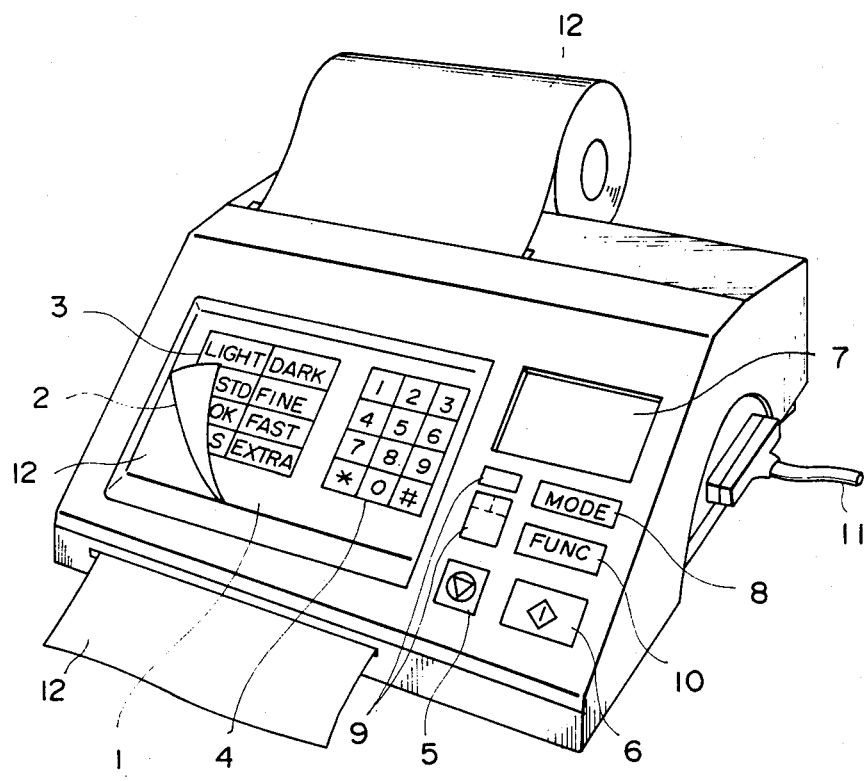
FIG. 9 is an external view of a coordinates input system of another embodiment.

FIG. 9 is an external view of a coordinates input system in which hand-written characters are left according to the second embodiment. In the diagram, the same parts and components as those in FIG. 9 are designated by the same reference numerals and their descriptions are omitted.

According to the coordinates input system in this embodiment, a paper 12 such as pressure sensitive paper, ordinary paper, or the like passes through the portion between the resistance sheet in the coordinates input unit 1 and the print sheet 2. With this construction, when characters or the like are input by use of a writing tool such as a ball-point pen in the coordinates input unit 1, the holograph is left on the paper 12, so that the work to confirm the display content by the display unit 7 can be omitted. On the other hand, if pressure sensitive paper is used as the paper 12, since this paper changes color only when a hand-writing pressure of a certain degree is applied, there is an effect that the correlation between the input data by the coordinates input unit 1 and the detection data in the memory 62 can be improved.

[Description of the coordinates input processes (FIG. 10)]

Figure 10:
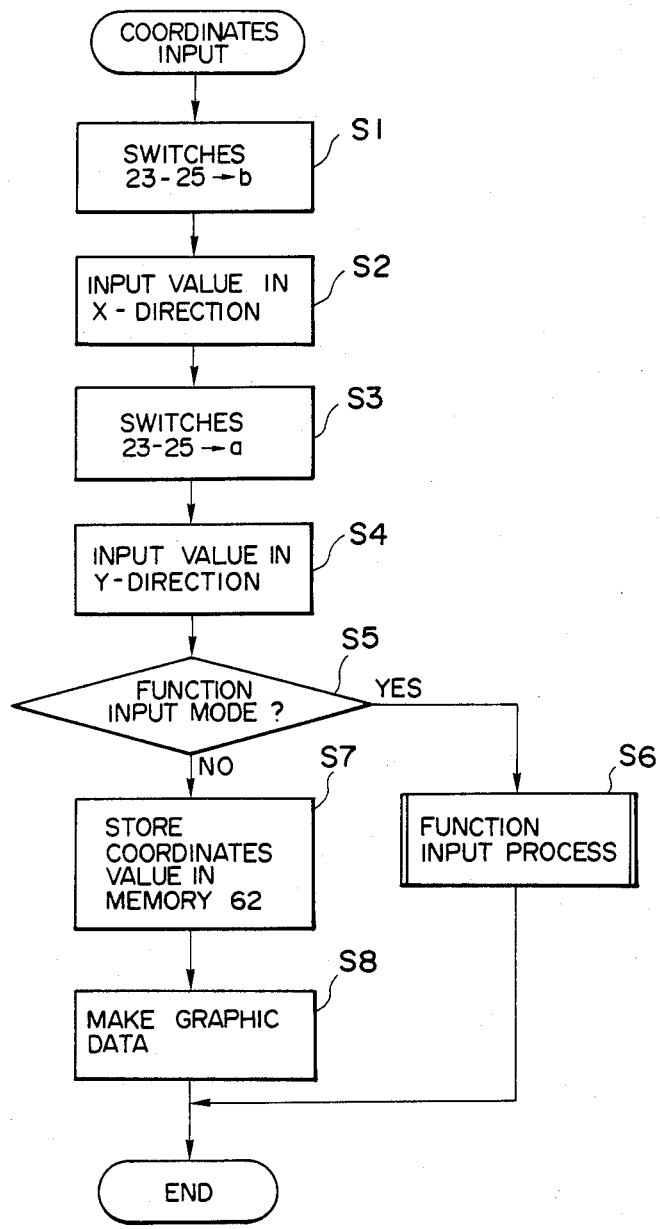
FIG. 10 is a flowchart for the coordinates input processes in a control unit.

FIG. 10 is a flowchart for the coordinates input processes in the control unit 60. This program is stored in the ROM in the control unit.

First, in step S1, the switches 23 to 25 are switched to the b side. In step S2, the coordinate value in the x direction is input. As mentioned above, the digital voltage value from the A/D converter 65 is input and the position in the x direction is detected on the basis of the voltage value, the voltage value between the electrodes, and the distance between the electrodes. In step S3, the switches 23 to 25 are all switched to the a side. In step S4, the coordinate value in the y direction is detected.

In step S5, a check is made by, e.g., the function key 10 or the like to see if the function input mode has been set or not. If YES, step S6 follows to execute the function input processes shown in FIG. 11.

If NO in step S5, step S7 follows to store the input coordinates values into the memory 67 of the two-dimensional coordinates system in the memory 62.

In the next step S8, the graphic data such as characters, symbols, or the like is made.

If the start key 8 has been depressed thereafter, the transmission of the grahpic data corresponding to the instruction of the mode key 8 to the facsimile apparatus is started. The facsimile apparatus performs the synthesis or the like of the transmitting original and the graphic data from the coordinates input system in correspondence to the transmitted data and outputs the resultant data to the line.

[Description of the function input processes (FIG. 11)]

Figure 11:
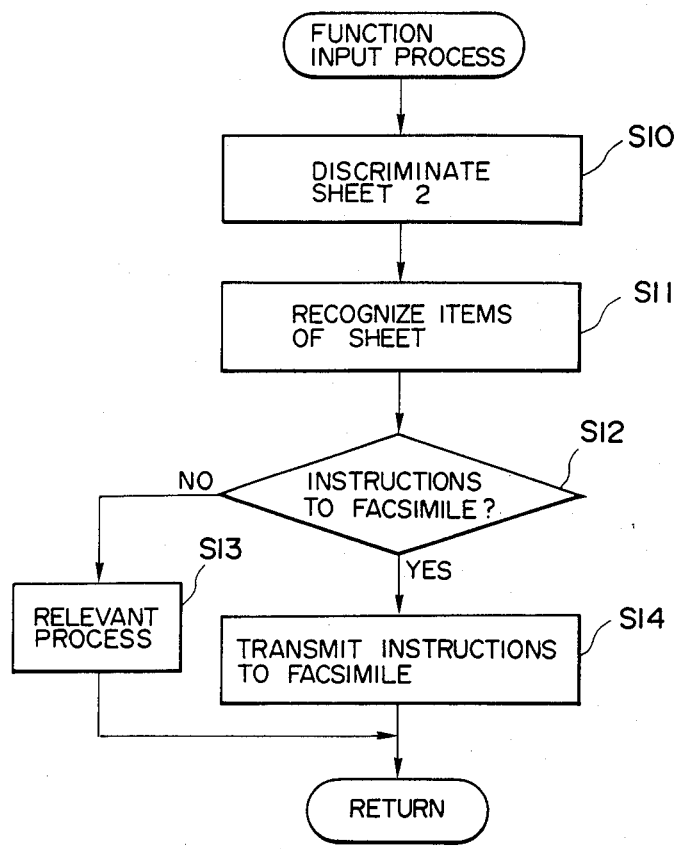
FIG. 11 is a flowchart for the function input processes.

FIG. 11 is a flowchart for the function input processes shown in step S6 in FIG. 10.

First, in step S10, the kind of sheet 2 set on the coordinates input unit 1 is discriminated. In step S11, the coordinates positions input in steps S1 to S4 and the display items of the sheet 2 are made to correspond and the items are recognized. The data which corresponds to the kind of sheet 2 and in which the coordinates values and the items of the sheet 2 have previously been made to correspond is stored in the ROM or the like in the control unit 60. The items of the sheet 2 are recognized on the basis of the detected input coordinates values. In step S12, a check is made to see if the items are instructions to the facsimile apparatus or not. If NO, the processes corresponding to the items are executed in step S13.

I claim:

1. A coordinates input system which is connected to a data transmitter, said system comprising:
   coordinates input means, comprising a plate, for detecting coordinate values which are input onto said plate;
   a sheet member set on said plate, said sheet member bearing a collection of instructions for the data transmitter;
   instructing means for outputting a signal representing an instruction from said collection of instructions on said sheet member which instruction corresponds to said coordinate values;
   control means for receiving the signals and for outputting the instructions to the data transmitter; and
   synthesizing means for receiving graphic data from said coordinates input means and synthesizing the graphic data with an original to be transmitted by the data transmitter.

2. A system according to claim 1, wherein the data transmitter is a facsimile apparatus.

3. A coordinates input system which is connected to a data transmitter, said system comprising:
   coordinates input means for detecting coordinate values which are input onto a plate;

means for making graphic data on the basis of the coordinate values from said coordinates input means; and synthesizing means for synthesizing the graphic data with an original to be transmitted by the data transmitter.

4. A system according to claim 3, wherein said synthesizing means has instructing means for instructing the positional relation between the original and the graphic data and variable magnifying means for variably magnifying the graphic data.

5. A system according to claim 3, wherein the data transmitter is a facsimile apparatus.

6. A system according to claim 1, further having output control means for outputting the synthetic data, resulting from synthesis of the graphic data and the original which were synthesized by said synthesizing means, to the data transmitter.

7. A system according to claim 3, further having output control means for outputting the synthetic data, resulting from the synthesis of the graphic data and the original which were synthesized by said synthesizing means, to the data transmitter.

8. A coordinates input system which is connected to a data transmitter, said system comprising:

coordinates input means, comprising a plate, for detecting coordinate values which are input onto said plate;

a sheet member set on said plate, said sheet member bearing a collection of instructions for the data transmitter;

control means for which instruction corresponds to said coordinate value outputting an instruction from said collection of instruction to the data transmitter; and synthesizing means for receiving graphic data from said coordinates input means and synthesizing the graphic data with an original to be transmitted by the data transmitter.

9. A system according to claim 8, wherein the data transmitter is a facsimile apparatus.

10. A system according to claim 8, further having output control means for outputting the synthetic data, resulting from synthesis of the graphic data and the original which were synthesized by said synthesizing means, to the data transmitter.

11. A coordinates input system coupleable to a data transmitter, said system comprising:

coordinates input means, having a plate with a face for detecting coordinate values which are input onto said plate;

display means, disposed on the face of said plate, for displaying a collection of instructions for the data transmitter;

instruction means for outputting a signal representing an instruction from said collection of instructions displayed by said display means which instruction corresponds to said coordinate values;

control means for outputting an instruction signal corresponding to the signal output by said instruction means to the data transmitter; and synthesizing means for inputting graphic data via said coordinates input means and synthesizing the grahic data with an original to be transmitted by the data transmitter.

12. A system according to claim 11, wherein the data transmitter comprises a facsimile apparatus.

* * * * *

UNITED STATES PATENT AND TRADEMARK OFFICE
CERTIFICATE OF CORRECTION

PATENT NO. : 4,881,608
DATED : November 21, 1989
INVENTOR(S) : Shinnichirou Otsuki It is certified that error appears in the above-identified patent and that said Letters Patent is hereby corrected as shown below:

COLUMN 1:

Line 25, change "struction" to --structions--.

COLUMN 2:

Line 21, delete "to" (first occurrence).

Line 23, change "perfrom" to --perform--.

Line 45, change "formed as" to --formed by uniformly coating a resistive material such as--.

Line 46, delete "material such as carbon or the like onto the surface".

Line 54, change "in shown" to --is shown--.

COLUMN 3:

Line 24, change "arbitary" to --arbitrary--.

Line 27, change "sheets 31 aqnd 32" to --sheets 31 and 32--

Line 51, change "detected. [Overall" to
--detected.
[Overall-- (begin a new paragraph).

UNITED STATES PATENT AND TRADEMARK OFFICE
CERTIFICATE OF CORRECTION

Page 2 of 3

PATENT NO. : 4,881,608
DATED : November 21, 1989
INVENTOR(S) : Shinnichirou Otsuki It is certified that error appears in the above-identified patent and that said Letters Patent is hereby corrected as shown below:

COLUMN 4:

Line 2, change "two dimensional" to --two-dimensional--.

Line 7, change "and A/D converter" to --an A/D converter-

Line 27, change "55 mm/sec" to --500 mm/sec--.

Line 31, change "becomes" to
--becomes $\frac{500}{0.25} = 2000$ (dots/sec).--.

Line 39, change "FIG. 5. [Ex-" to
--FIG. 5.
[Ex-- (begin a new paragraph).

Line 55, change "coordinates input unit" to
--coordinates input unit 1--.

COLUMN 5:

Line 17, change "orignal" to --original--.

Line 42, change "FIG. 9" to --FIG. 1--.

COLUMN 6:

Line 18, change "grahpic data" to --graphic data--.

UNITED STATES PATENT AND TRADEMARK OFFICE
CERTIFICATE OF CORRECTION

PATENT NO. : 4,881,608                    Page 3 of 3
DATED     : November 21, 1989
INVENTOR(S) : Shinnichirou Otsuki It is certified that error appears in the above-identified patent and that said Letters Patent is hereby corrected as shown below:

COLUMN 7:

Line 22, change "the synthesis" to --synthesis--.

COLUMN 8:

Line 16, change "face" to --face,--.

line 31, change "grahic data" to --graphic data--.

Signed and Sealed this

Second Day of April, 1991

Attest:

HARRY F. MANBECK, JR.

*Attesting Officer*　　　　*Commissioner of Patents and Trademarks*